Patented June 27, 1944

2,352,519

UNITED STATES PATENT OFFICE 2,352,519

TREATMENT OF ACID SETTING BATHS USED IN THE MANUFACTURE OF CELLULOSE PRODUCTS FROM VISCOSE

Joseph L. Costa, Hinsdale, Ill., and William Harlow Kahler, Saylesville, R. I., assignors to Manville Jenckes Corporation, Manville, R. I., a corporation of Delaware No Drawing. Application September 14, 1943, Serial No. 502,296

10 Claims. (Cl. 210—53)

The present invention relates to a new and improved composition of acid setting baths utilized in the manufacture of cellulose products from viscose, and is more especially concerned with an improved process for the separation by flotation of sulfur from the acid setting solution employed, for example, in the manufacture of artificial silk in accordance with the viscose wet spinning process.

In accordance with the invention, applicants provide a novel composition of an acid setting bath which they have discovered to be very favorable to the flotation of sulfur therefrom, and which is at the same time not deleterious to the manufacturing process in any way. More specifically, applicants have made the discovery that certain classes of wetting agents selected for their sulfur wetting powers and for their stability and solubility in acid when employed in the acid setting solution in a special range of concentrations, provide ideal reagents to be added to the acid setting bath for the flotation of sulfur therefrom.

By "wetting agents" is meant a class of surface active compounds comprising one or more hydrocarbon groups connected to a water solubilizing polar group in such a manner that the resulting structure processes hydrophilic-hydrophobic balance, and has the property of lowering the surface tension of water and aqueous solutions when added thereto, thus enabling the production of froth by the means usual to the flotation art. The terms hydrophilic and hydrophobic are used to define the functions of the respective parts of the compounds employed in the practice of the applicants' invention, and are used in the sense generally understood in physico-chemical terminology, as exemplified in "Wetting and Detergency," published by the Chemical Publishing Co., of New York, 1939.

The hydrophilic polar group in the several compounds within the classes of wetting agents referred to will consist, for example, of the basic nitrogen atom as present in certain ammonia, amino and amido compounds, the sulfuric and sulfonic acid radicals as present in the substituted sulfate and sulfonate compounds hereinafter listed, and the polyhydroxy and polyether groups in the substituted glycol and polyglycol condensation products hereinafter listed. The hydrophobic portions of the several compounds referred to are the hydrocarbon substitution groups contained therein consisting of aliphatic, aromatic, or substituted aromatic hydrocarbon groups of from 5 to 20 carbon atoms.

Over a wide range of concentrations, such compound could be expected to, and actually do behave as non-collection frothers, in water and aqueous solutions, and are therefore of themselves not regarded essentially as flotation agents.

Contrary to expectations, applicants have found that certain wetting agents of the general type described, when added to the fouled setting solution in the proper concentrations, have a powerful action as collecting frothers to separate out the sulfur, and further that the inclusion of such wetting agents in the composition of the acid setting solution within the range of concentrations herein specified, has no deleterious effects whatever on the spinning process.

Compounds of the general class including the ammonia, amino and amido compounds above referred to which contain the hydrophobic group in that portion of the molecule which yields the positive ion form the subject-matter of applicants' co-pending application Serial No. 318,136, filed February 9, 1940, issued to Patent No. 2,336,778, dated December 14, 1943, for Treatment of acid setting baths used in the manufacture of cellulose products from viscose, of which the present application is a continuation in part.

The present application is concerned particularly with the use of compounds possessing characteristic hydrophilic, hydrophobic balance but which are not generally considered to be ionogenic as exemplified by the substituted glycol and polyglycol condensation products above referred to, and further with the use of such compounds in combination with certain surface active compounds which contain the hydrophobic group in the negatively charged portion of the molecule or anion.

The invention will more readily be understood from the following examples:

*Example I*

(a) Three kilograms of a typical viscose regenerating bath containing approximately 10 per cent of sulfuric acid, 18 per cent of sodium sulfate, 2 per cent of zinc sulfate, and heavily fouled with suspended sulfur were treated in a laboratory model Fagergren flotation machine with approximately .0006% (by weight) of a dodecyl polyglycol ether. The froth was fairly low and well mineralized and a quite satisfactory clarification was obtained in 2 minutes.

(b) Three kilogram portions of a typical viscose regenerating bath of approximately the same composition as set forth in paragraph (a)

were treated with approximately .0004% to .016% (by weight) of an octadecyl polyglycol condensation product. At the middle range of concentration noted, the froth was of good quality and clarification was satisfactory at the end of two minutes.

*Example II*

(a) A large scale test was made using approximately 1 P. P. M. (by weight) of an alkylated phenyl polyglycol ether, known to the trade as Igepal CTA. Observations in this experiment showed that although the substance used was an excellent collector, it was deficient in frothing properties. Further experiments using this same compound over the range of 0.3 to 3.0 P. P. M. (by weight) together with the acid stable frothing agents, sodium oleyl amido ethyl sulfonate, known to the trade as Igepon T and alkylated naphthalene sodium sufonate of low carbon range in the alkyl group known to the trade as Daxad 11, in the same concentration range, gave up to 90% clarification in approximately 4 minutes flotation time when the amounts of the three constituents were properly adjusted within the range given.

The group of compounds which has been referred to as non-ionogenic in character and which forms particularly the subject-matter of the present invention possesses marked sulfur collecting powers coupled with a frothing ability of moderate strength, as will be evident from an inspection of Examples I and II. In this group are included compounds comprising a hydrocarbon group of 5 to 18 carbon atoms connected to a polyether nucleus of hydrophilic character, such as the mono-octyl ethers of di-, tri-, and poly-ethylene glycols, alkylated phenyl polyglycol ethers, dodecyl polyglycol ethers or esters, octadecyl polyglycol condensation compounds, such as the products obtained by the condensation of ethylene oxide with oleic or stearic acids or with the alcohols obtained from the reduction of such acids.

Surface active compounds which contain the hydrophobic group in the negatively charged portion of the molecule or anion exhibit strong frothing powers but poor sulfur collecting ability. Applicants have made the further discovery, however, that these substances may be employed with advantage in connection with compounds from the first-mentioned non-iogenic group, as exemplified in Example II for the flotation of sulfur from the spin bath to produce a very good clarification of the spin bath within a reasonably short period of time. The following compounds may be mentioned as representative of this group—sodium dodecyl sulfate, sodium tetrahydro-naphthalene sulfonate, monobutyl diphenyl sodium monosulfonate, sodium isobutyl naphthalene sulfonate, and mixtures of such surface active compounds containing sodium dodecyl sulfate and free dodecyl alcohol, added as such, or resulting from hydrolysis of the former, with or without pine oil. Such compounds will also include any sulfonic acid of a petroleum hydrocarbon containing from 6 to 16 carbon atoms or its sodium salt.

Applicants' discovery that surface active materials of the general classes described may be employed in certain concentrations in the composition of acid setting solutions for the removal of sulfur from the fouled solution by froth flotation, constitutes an important advance in the art, both in point of efficiency of the clarifying process, and in point of availability of such a process for use under prevailing commercial conditions. The recovery of sulfur obtained has been found to be more complete and much more rapid than in the case of reagents previously employed. These substances have been found ideal, in that they have boiling points so high that there is little or no tendency for evaporation when the setting solution is passed through the usual vacuum evaporators. Loss of the reagent from the solution due to evaporation is therefore substantially prevented, and replacement reduced to a minimum. Furthermore, these substances have been found to be extremely stable in solution, so that there is no tendency toward the giving off of any fumes or odors which could produce deleterious effects on the mill operatives. These substances have the further advantage that in the extremely small concentrations employed, no deleterious effects can be detected either in the effective composition of the bath or in the viscose coagulating or spinning operation associated therewith.

The invention having been described, what is claimed is:

1. A method of clarifying fouled regenerating baths from the regeneration of hydrated cellulose from viscose, which baths contain sulfur deposited out of solution, which consists of subjecting the bath to flotation by passing an inert gas through the bath in the presence of a non-ionogenic surface active compound which comprises a hydrocarbon group of 5 to 18 carbon atoms connected to a polyether nucleus of hydrophilic character in a concentration optimum for the flotation of sulfur formed as a by product in the bath, and removing the froth which contains the bulk of the turbid impurities.

2. A method of clarifying fouled regenerating baths from the regeneration of hydrated cellulose from viscose, which baths contain sulfur deposited out of solution, which consists of subjecting the bath to flotation by passing an inert gas through the bath in the presence of an acid stable surface active compound which comprises a hydrocarbon group of 5 to 18 carbon atoms connected to a polyether nucleus of hydrophilic character, said compound being present in a concentration range from .00003% to .016% by weight, and removing the froth which contains the bulk of the turbid impurities.

3. A method of clarifying fouled regenerating baths from the regeneration of hydrated cellulose from viscose, which baths contain sulfur deposited out of solution, which consists of subjecting the bath to flotation by passing an inert gas through the bath in the presence of an alkylated phenyl polyglycol ether containing from 4 to 50 ethenoxy groups in a concentration optimum for the flotation of sulfur formed as a by product in the bath, and removing the froth which contains the bulk of the turbid impurities.

4. The method as described in claim 3, in which the alkylated phenyl polyglycol ether containing 4 to 50 ethenoxy groups is present in a concentration range from .3 to 3. P. P. M. by weight based on the total weight of the regenerating bath.

5. A method of clarifying fouled regenerating baths from the regeneration of hydrated cellulose from viscose, which baths contain sulfur deposited out of solution, which consists of subjecting the bath to flotation by passing an inert gas through the bath in the presence of a water soluble octadecyl polyglycol condensation compound containing from 4 to 50 ethenoxy groups in a concentration optimum for the flotation of sulfur formed as a by product in the bath, and removing the froth which contains the bulk of the turbid impurities.

6. The method as described in claim 5 in which the octadecyl polyglycol condensation compound containing from 4 to 50 ethenoxy groups is present in a concentration range from .0004% to .016% by weight, based on the total weight of the regenerating bath.

7. A method of clarifying fouled regenerating baths from the regeneration of hydrated cellulose from viscose, which consists of subjecting said baths to flotation by passing an inert gas upwardly therethrough in the presence of an alkylated phenyl polyglycol ether containing from 4 to 50 ethenoxy groups in combination with sodium oleyl amido ethyl sulfonate and an alkylated naphthalene sodium sulfonate of low carbon range in the alkyl group in concentration ranges optimum for frothing and collecting of sulfur formed as a by-product in the bath, whereby efficient frothing and collecting properties are maintained, and removing the froth which contains the bulk of the turbid impurities.

8. The method as described in claim 7, in which each of the surface active agents named is present in the concentration range of 0.3 to 3.0 P. P. M. by weight of the regenerating bath.

9. A method of clarifying fouled regenerating baths from the regeneration of hydrated cellulose from viscose, which baths contain sulfur deposited out of solution, which consists of subjecting the bath to flotation by passing an inert gas through the bath in the presence of a non-ionogenic surface active compound which comprises a hydrocarbon group of 5 to 18 carbon atoms connected to a polyether nucleus of hydrophilic character selected from the group consisting of mono-octyl ethers of di-, tri-, and poly-ethylene glycols, alkylated phenyl polyglycol ethers, dodecyl polyglycol ethers and esters, and octadecyl polyglycol condensation compounds, said compound being present in a concentration optimum for the flotation of sulfur formed as a by product in the bath, and removing the froth which contains the bulk of the turbid impurities.

10. A method of clarifying fouled regenerating baths from the regeneration of hydrated cellulose from viscose, which baths contain sulfur deposited out of solution, which consists of subjecting the bath to flotation by passing an inert gas through the bath in the presence of a non-ionogenic surface active compound which comprises a hydrocarbon group of 5 to 18 carbon atoms connected to a polyether nucleus of hydrophilic character selected from the group consisting of mono-octyl ethers of di-, tri-, and poly-ethylene glycols, alkylated phenyl polyglycol ethers, dodecyl polyglycol ethers and esters, and octadecyl polyglycol condensation compounds, in combination with sodium oleyl amido ethyl sulfonate and an alkylated naphthalene sodium sulfonate of low carbon range in the alkyl group, said compounds being present in concentration ranges optimum for frothing and collecting of sulfur formed as a by product in the bath, and removing the froth which contains the bulk of the turbid impurities.

JOSEPH L. COSTA.
WILLIAM HARLOW KAHLER.